(12) United States Patent
Katsumura

(10) Patent No.: US 6,657,934 B2
(45) Date of Patent: Dec. 2, 2003

(54) INFORMATION RECORDING APPARATUS AND METHOD THEREFOR

(75) Inventor: Masahiro Katsumura, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 408 days.

(21) Appl. No.: 09/790,287

(22) Filed: Feb. 20, 2001

(65) Prior Publication Data

US 2001/0053113 A1 Dec. 20, 2001

(30) Foreign Application Priority Data

Feb. 22, 2002 (JP) ........................................ 2000-044754

(51) Int. Cl.$^7$ ................................................. G11B 7/00
(52) U.S. Cl. .................. 369/47.49; 369/59.1; 369/44.31
(58) Field of Search ........................... 369/44.26, 44.31, 369/47.49, 47.36, 59.11, 59.12, 116, 121, 111, 100, 126, 127, 133, 59.1

(56) References Cited

U.S. PATENT DOCUMENTS 4,783,776 A * 11/1988 Ishigaki et al. ............. 369/121
4,896,313 A * 1/1990 Hirose et al. ............... 369/111
5,107,483 A * 4/1992 Nakajima et al. ........... 369/108
5,546,364 A * 8/1996 Fuji et al. ................. 369/13.54

* cited by examiner

Primary Examiner—Thang V. Tran
(74) Attorney, Agent, or Firm—Perman & Green, LLP

(57) ABSTRACT

An information recording apparatus and a method therefor which can form a beam guide groove in the shape of highly accurate rectangle having abrupt edges. A recording mark is formed by exposing a recording medium with a recording beam having a beam diameter smaller than the beam guide groove, while periodically vibrating the recording beam in a direction perpendicular to a recording track on the recording medium, or in both horizontal and vertical directions of the recording track. For this purpose, the information recording apparatus for forming a recording mark of a predetermined width in accordance with recording information on a recording surface of an information recording medium comprises, in addition to components conventionally provided therein, recording beam generator for generating a recording beam having a smaller diameter than the width of the recording mark, a displacement information generator for generating displacement information of the recording beam based on the generated recording information, and a beam position controller for offsetting the recording beam based on the displacement information.

6 Claims, 3 Drawing Sheets

INFORMATION RECORDING APPARATUS AND METHOD THEREFOR

BACKGROUND OF THE INVENTION

1. Field of the Invention

The present invention relates to an information recording apparatus and a method therefor which are particularly suitable for use in an original disk recording apparatus for a recordable optical disk such as a magneto-optical disk, a phase-change optical disk and so on.

2. Description of the Related Art

A recordable optical disk as mentioned above has previously recorded thereon guide grooves for guiding an optical beam to a recording track, and pre-information such as address data. Such pre-information is transferred from an original optical disk (stamper), which is a die having the pre-information formed thereon, to a disk substrate of a recordable optical disk by an ultraviolet curing resin or the like.

An exemplary method of manufacturing the foregoing stamper is described below. Specifically, a resist film is formed on a glass substrate, and this resist film is exposed to form a latent image. The exposed portions are developed to form a predetermined groove pattern. Next, after performing a nickel conductive coating treatment, a nickel layer of approximately 0.3 mm in thickness is formed by nickel electroforming. Subsequently, the nickel layer is peered off of the glass substrate, and the opposite side of the groove pattern is polished to complete a stamper.

Generally, a light intensity distribution of an exposure beam for forming grooves is highest at the center of the optical axis and lower toward the periphery, and in other words, presents a distribution close to a so-called Gaussian distribution. Therefore, when a resist is traced with such an exposure beam, the resulting grooves formed thereby have a trapezoidal cross-section which extends obliquely from the base to the opening.

For realizing an optical disk of a larger capacity and a higher density, the track pitch must be reduced. Therefore, when the resist is traced with the exposure beam having the light intensity distribution as mentioned above to form grooves, a narrower track pitch will exert an unignorable influence on flat regions (lands) between grooves, which should not be exposed. Specifically, the flat regions experience multiple influences of the exposure, which is made for forming grooves on both sides of the flat regions (influence by divergence near the opening of the trapezoidal cross-section of the grooves due to the light intensity distribution of the exposure beam). In an extreme case, the amount of exposure on the flat regions is close to the amount of exposure on the grooves, so that when the resist is developed, the flat regions are lost, resulting in adjacent grooves joined into one groove. Also, in a case not so extreme as the above, an optical disk manufactured from this stamper will suffer from adverse influences, such as a lower S/N ratio of signals recorded thereon or reproduced therefrom.

OBJECT AND SUMMARY OF THE INVENTION

The present invention has been made in view of the situation described above, and an object the present invention is to provide an information recording apparatus and a method therefor which are capable of reducing the influence of exposure due to an exposure beam to increase the contrast of the exposure amount between flat regions and grooves.

To solve the above problem, an information recording apparatus according to a first aspect of the present invention is an information recording apparatus for forming a recording mark of a predetermined width in accordance with recording information on a recording surface of an information recording medium transported at a predetermined linear velocity. The information recording apparatus comprises recording beam generator for generating a recording beam having a diameter smaller than the predetermined width; recording information generator for generating the recording information; displacement information generator for generating displacement information of the recording beam based on the generated recording information; and rotation controller for driving the information recording medium to rotate at a predetermined linear velocity.

With the foregoing configuration, the beam guide groove can be formed in the shape of highly accurate rectangle having abrupt edges by recording the recording mark using the recording beam having a diameter smaller than the width of the recording mark to be formed while vibrating the recording beam at a high speed at least in the radial direction.

According to a second aspect of the present invention, in the foregoing information recording apparatus, the displacement information generator comprises X-direction displacement signal generator for generating a displacement signal in a direction in which the information recording medium is transported (X-direction); and Y-direction displacement signal generator for generating a displacement signal in a direction (Y-direction) perpendicular to the direction in which the information recording medium is transported, and the beam position controller further comprises X-direction offsetting part for offsetting the recording beam in the X-direction based on the X-direction displacement signal; and Y-direction offsetting part for offsetting the recording beam in the Y-direction based on the Y-direction displacement signal.

Also, according to a third aspect of the present invention, in the information recording apparatus according to the second feature, the displacement signals $X(t), Y(t)$ generated by the X-direction displacement signal generator and the Y-direction displacement signal generator, respectively, are periodic functions expressed by:

$$X(t)=0,$$

$$Y(t)=b \cdot \sin \omega_y t,$$

where $\underline{b}$ is an amplitude in the Y-direction.

Further, according to a fourth aspect of the present invention, in the information recording apparatus according to the second feature, the displacement signals $X(t)$, $Y(t)$ generated by the X-direction displacement signal generator and the Y-direction displacement signal generator, respectively, are periodic functions expressed by:

$$X(t)=a \cdot \sin \omega_x t,$$

$$Y(t)=b \cdot \sin(\omega_y t + \phi),$$

where $\underline{a}$, $\underline{b}$ are amplitudes in the X-direction and Y-direction, respectively, and $\phi$ is a phase difference.

Thus, the recording mark is formed by exposing the recording medium with the recording beam having a smaller beam diameter than the beam guide groove while periodically vibrating the recording beam in a direction perpendicular to the recording track on the recording medium (Y-direction), or both in the horizontal (X-direction) and vertical (Y-direction) directions, thereby making it possible to form the beam guide groove in the shape of highly accurate rectangle having abrupt edges.

An information recording method according to a fifth aspect of the present invention is an information recording method for forming a recording mark of a predetermined width in accordance with recording information on a recording surface of an information recording medium, wherein the recording medium is exposed with a recording beam having a beam diameter smaller than the predetermined width, while periodically vibrating the recording beam in a direction perpendicular to a direction in which the recording medium is transported, to form a desired recording mark.

Also, according to a sixth aspect of the present invention, in the foregoing information recording method, the recording medium is exposed with a recording beam having a beam diameter smaller than the predetermined width, while periodically vibrating recording beam at least in a direction in which the recording medium is transported (X-direction) and in a direction (Y-direction) perpendicular to the transporting direction, respectively, with proper frequency and phase difference, to form a desired recording mark.

Thus, the recording mark is formed by exposing the recording medium with the recording beam having a smaller beam diameter than the beam guide groove while periodically vibrating the recording beam in the direction perpendicular to the recording track on the recording medium, or both in the horizontal and vertical directions, thereby making it possible to form the beam guide groove in the shape of highly accurate rectangle having abrupt edges. It is therefore possible to manufacture an original disk recording apparatus for high density recording with a narrow track pitch.

BRIEF DESCRIPTION OF THE DRAWINGS

FIGS. 2A to 2C are diagrams cited for explaining the operation of the embodiment according to the present invention, wherein FIG. 2A shows a dose; FIG. 2B a trajectory of a recording beam; and FIG. 2C a beam displacement, respectively; and FIGS. 3A to 3C are diagrams cited for explaining the operation of the embodiment according to the present invention, wherein FIG. 3A shows a dose; FIG. 3B a trajectory of a recording beam; and FIG. 3C a beam displacement, respectively.

DETAILED DESCRIPTION OF THE PREFERRED EMBODIMENT

Figure 1:
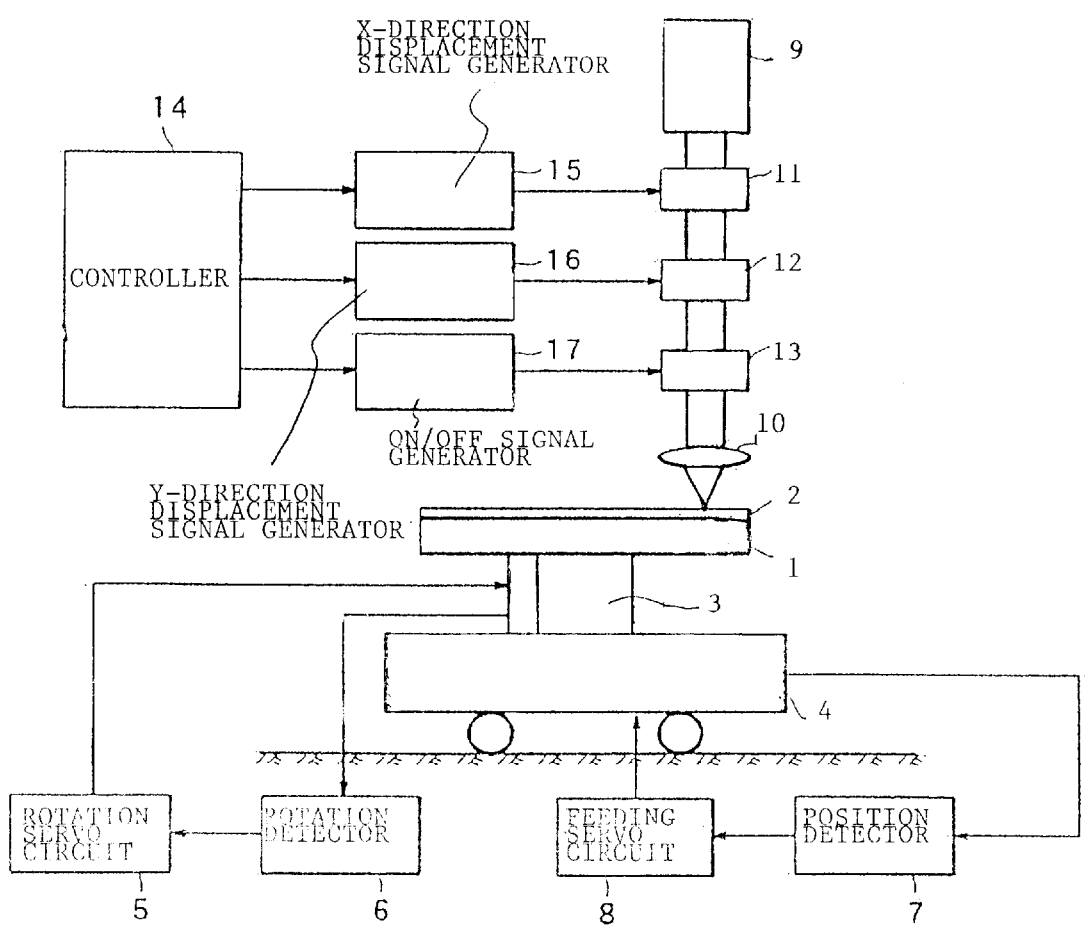
FIG. 1 is a block diagram illustrating an embodiment of an information recording apparatus according to the present invention.

FIG. 1 is a block diagram illustrating an embodiment of an information recording apparatus according to the present invention. Here, a laser original disk recording apparatus is illustrated as an information recording apparatus.

In FIG. 1, reference numeral 9 designates a large-power laser generator. A laser beam generated by the laser generator 9 is deflected in both X- and Y-directions by an X-direction light deflector 11 and a Y-direction light deflector 12, respectively, and supplied to a light modulator 13. The X-direction light deflector 11 is supplied with an X-direction displacement signal through an X-direction displacement signal generator 15, while the Y-direction light deflector 12 is supplied with a Y-direction displacement signal through a Y-direction displacement signal generator 16. The light modulator 13 in turn is supplied with cutting information, which carries pre-information (information for cutting grooves in this embodiment), sent thereto from a controller 14 through an ON/OFF signal generator 17. The laser beam is optically modulated in the light modulator 13, and converged by an objective lens 10 to form a spot focused on a resist 2 on a glass master disk 1.

The glass master disk 1 is set up on a spindle motor 3 which is rotated at a constant linear velocity (CLV) by a rotation detector 6 and a rotation servo circuit 5. Further, the glass master disk 1 can be fed in a radial direction thereof by a feeding unit 4, so that a groove is cut spirally on a resist surface 2 of the glass master disk 1 from the center of the disk 1 to the outer periphery of the disk 1 by controlling the glass master disk 1 to feed in the radial direction at a predetermined feeding velocity by a position detector 7 and a feed servo circuit 8.

Next, the operation of the original disk recording apparatus illustrated in FIG. 1 will be described with reference to FIGS. 2A to 2C. This embodiment is described for an illustrative case where a groove having a width of 0.32 $\mu$m is cut using an exposure beam which is emitted from the laser generator 9, and converted by the objective lens 10 to have a beam diameter of 0.12 $\mu$m on the resist 2.

In this example, the exposure beam is vibrated, while performing a recording operation, with a frequency and a phase difference given by functions shown in the following equations (1) and (2) in a direction in which the glass master disk 1 is transported, i.e., in the direction of the rotation by the spindle motor 3 (in a direction in which the cutting information is recorded. In this embodiment, this direction is called the X-direction), and in a direction perpendicular to the X-direction (similarly, this direction is called the Y-direction):

$$X(t)=a \cdot \sin \omega_X t \tag{1}$$

$$Y(t)=b \cdot \sin(\omega_Y t + \phi) \tag{2}$$

The X-direction displacement information generator 15, which comprises a processor for processing the function given by the equation (1), generates an X-direction displacement signal based on parameters provided from the controller 14 (amplitude $\underline{a}$, frequency $f_X$) and a processing timing signal, and supplies the X-direction displacement signal to the light deflector 12.

Similarly, the Y-direction displacement information generator 16, which comprises a processor for processing the function given by the equation (2), generates a Y-direction displacement signal based on parameters provided from the controller 14 (line width $\underline{d}$, frequency $f_Y$, phase difference $\phi$) and a processing timing signal, and supplies the Y-direction displacement signal to the light deflector 11.

The controller 14 outputs corresponding parameters and processing timing signals to the respective displacement information generators 15, 16, and supplies the ON/OFF signal generator 17 with an ON/OFF timing signal for a recording beam in accordance with recording information. The ON/OFF signal generator 17 outputs a driving signal for the light modulator 13 in response to the ON/OFF timing signal. The light modulator 13 transmits/blocks a light beam supplied from the laser generator 9 based on the supplied driving signal. Therefore, as the timing signal indicative of an ON state is output from the controller 14, an exposure beam emitted from the laser generator 9 is lead onto the resist 2 for cutting, i.e., formation of recording marks.

Figure 2A:
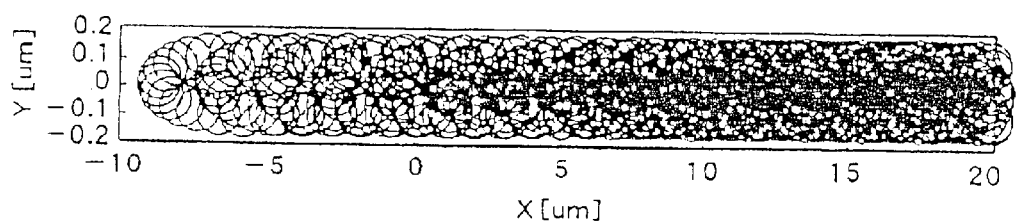
Figure 2B:
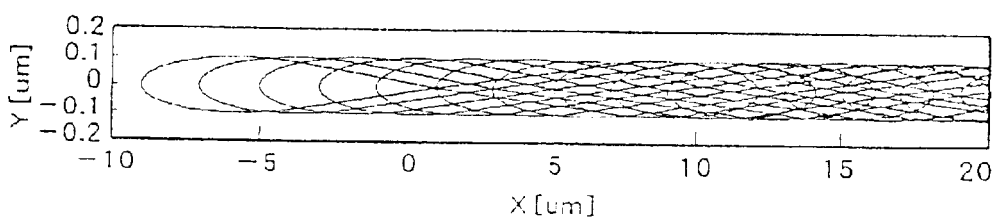
Figure 2C:
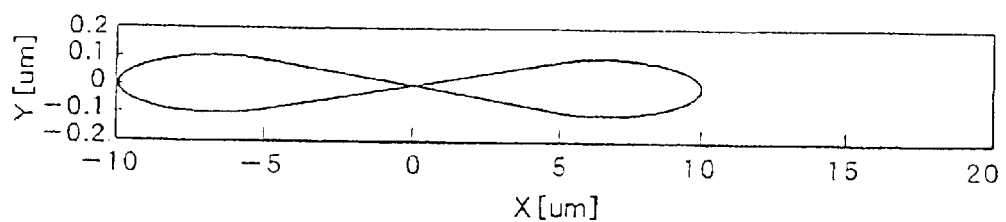

FIGS. 2A to 2C plot the exposure beam, represented as a circle having a diameter of 0.12 $\mu$m, every 0.2 ms, under condition that the glass master disk 1 is rotated at a linear velocity v=0.2 m/s with the aforementioned parameters set as follows: X-direction amplitude a=10 µm; X-direction frequency $f_X$=100 kHz; Y-direction amplitude b=0.1 µm; Y-direction frequency $f_Y$=200 kHz; and phase difference φ=90 deg. FIG. 2A shows a dose; FIG. 2B a trajectory of the recording beam; and FIG. 2C a beam displacement, respectively.

In the example shown in FIGS. 2A to 2C, the exposure beam is vibrated with proper frequency and phase difference both in the radial direction and in the recording direction to appear as a Lissajou waveform having the shape of "8" to swing the cutting beam together with the rotation of the glass master disk 1, resulting in the formation of a spiral beam guide groove on the resist 2. Here, since the amplitude b in the vertical direction Y of the vibration is 0.1 µm (0.2 µm when measured as a peak-to-peak amplitude), the width of the groove actually cut when the recording beam diameter is at maximum (0.12 µm) is 0.32 µm which is the sum of 0.2 µm and 0.12 µm.

Since both signals X(t), Y(t) are periodical functions, the X-direction displacement signal generator 15 and the Y-direction displacement signal generator 16 can readily output one period of respective time waveforms in repetition. This causes the recording beam to draw a trajectory of the Lissajou waveform in the X- and Y-planes of the glass master disk 1. In this state, the mastering is performed while controlling the rotation and feeding of the glass master disk 1 as generally done.

Figure 3A:
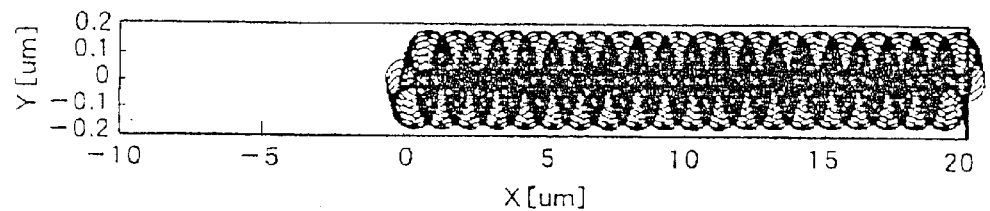
Figure 3B:
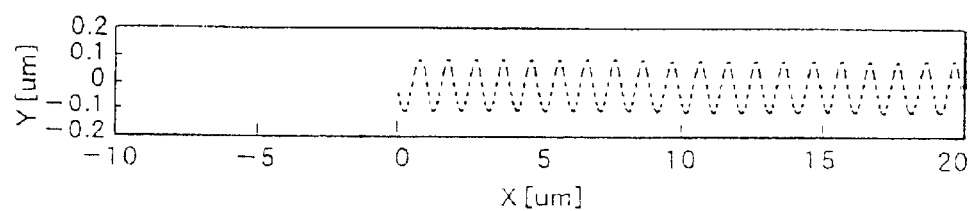
Figure 3C:
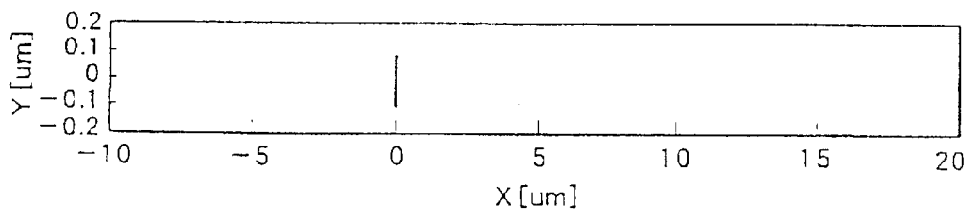

While in the foregoing embodiment, the exposure beam is vibrated in accordance with periodical functions in two directions, i.e., the X-direction and the Y-direction with respect to the exposure beam, the recording may be performed while periodically vibrating the exposure beam only in the Y-direction based on a function given by:

$$Y(t)=b \cdot \sin \omega_Y t \qquad (3)$$

with the amplitude in the X-direction set to zero, in which case similar effects can be provided. FIGS. 3A to 3C plot the exposure beam, represented as a circle having a diameter of 0.12 µm, every 0.2 ms, under condition that the glass master disk 1 is rotated at a linear velocity v=0.2 m/s with the aforementioned parameters set as follows: Y-direction amplitude b=0.1 µm; and Y-direction frequency $f_Y$=200 kHz. FIG. 3A shows a dose; FIG. 3B a trajectory of the recording beam; and FIG. 3C a beam displacement, respectively.

As described above, the information recording apparatus according to the present invention is an information recording apparatus for forming a recording mark of a predetermined width in accordance with recording information on a recording surface of an information recording medium transported at a predetermined linear velocity. The information recording apparatus comprises recording beam generator (laser generator 9) for generating a recording beam having a diameter smaller than the predetermined width, recording information generator (controller 14) for generating the recording information, displacement information generator (X-direction displacement signal generator 15, Y-direction displacement signal generator 16) for generating displacement information of the recording beam based on the generated recording information, and beam position controller (light deflector X11, light deflector Y12, light modulator 13) for offsetting the recording beam based on the displacement information, thereby forming a beam guide groove in the shape of highly accurate rectangle with abrupt edges.

While the foregoing embodiment of the present invention only describes an example in which a laser beam formed by the laser generator 9 is used as a recording beam, an electron beam, if used, can provide a beam diameter smaller than the laser beam, so that the electron beam is more effective in forming a rectangular shape, and particularly suitable for high density recording. Also, while the foregoing embodiment illustrates only the technique for recording grooves as recording marks on the original disk recording apparatus as an information recording apparatus, the present invention can be similarly applied to a DVD recording apparatus for recording pits carrying audio data and video data as recording marks on a recordable disk having a transfer layer on which pre-information is transferred from a stamper fabricated by the original disk recording apparatus as described, or general recording apparatus.

As described above, the information recording method according to the present invention is an information recording method for forming a recording mark of a predetermined width in accordance with recording information on a recording surface of an information recording medium transported at a predetermined linear velocity, wherein a desired recording mark is formed by exposing a recording medium with a recording beam having a beam diameter smaller than a predetermined width, while the recording beam is periodically vibrated at least in a direction (Y-direction) perpendicular to a direction in which the recording medium is transported. For this purpose, the information recording apparatus for forming a recording mark of a predetermined width in accordance with recording information on a recording surface of an information recording medium comprises, in addition to components conventionally provided therein, a recording beam generator for generating a recording beam having a smaller diameter than the width of the recording mark, a displacement information generator for generating displacement information of the recording beam based on the generated recording information, and a beam position controller for offsetting the recording beam based on the displacement information.

The foregoing configuration enables the formation of the beam guide groove in the shape of highly accurate rectangle having abrupt edges. It is therefore possible to manufacture an original disk recording apparatus for high density recording with a narrow track pitch.

What is claimed is:

1. An information recording apparatus for forming a recording mark of a predetermined width in accordance with recording information on a recording surface of an information recording medium transported at a predetermined linear velocity, said information recording apparatus comprising:

recording beam generator for generating a recording beam having a diameter smaller than said predetermined width;

recording information generator for generating said recording information;

displacement information generator for generating displacement information of said recording beam based on said generated recording information; and beam position controller for offsetting said recording beam based on said displacement information.

2. An information recording apparatus according to claim 1, wherein said displacement information generator comprises:

X-direction displacement signal generator for generating a displacement signal in a direction in which said information recording medium is transported; and Y-direction displacement signal generator for generating a displacement signal in a direction (Y-direction) perpendicular to said direction in which said information recording medium is transported, and said beam position controller further comprises:

X-direction offsetting part for offsetting said recording beam in the X-direction based on said X-direction displacement signal; and Y-direction offsetting part for offsetting said recording beam in the Y-direction based on said Y-direction displacement signal.

3. An information recording apparatus according to claim 2, wherein said displacement signals X(t), Y(t) generated by said X-direction displacement signal generator and said Y-direction displacement signal generator, respectively, are periodic functions expressed by:

$$X(t)=0,$$

$$Y(t)=b \cdot \sin\omega_Y t,$$

where $b$ is an amplitude in the Y-direction.

4. An information recording apparatus according to claim 2, wherein said displacement signals X(t), Y(t) generated by said X-direction displacement signal generator and said Y-direction displacement signal generator, respectively, are periodic functions expressed by:

$$X(t)=a \cdot \sin\omega_X t,$$

$$Y(t)=b \cdot \sin(\omega_Y t+\phi),$$

where $a$, $b$ are amplitudes in the X-direction and Y-direction, respectively, and $\phi$ is a phase difference.

5. An information recording method for forming a recording mark of a predetermined width in accordance with recording information on a recording surface of an information recording medium transported at a predetermined linear velocity, wherein:

said recording medium is exposed with a recording beam having a beam diameter smaller than said predetermined width, while periodically vibrating said recording beam at least in a direction (Y-direction) perpendicular to a direction in which said recording medium is transported, to form a desired recording mark.

6. An information recording method according to claim 5, wherein said recording medium is exposed with a recording beam having a beam diameter smaller than said predetermined width, while periodically vibrating said recording beam in a direction in which said recording medium is transported (X-direction) and in a direction (Y-direction) perpendicular to said transporting direction, respectively, with proper frequency and phase difference, to form a desired recording mark.

* * * * *

UNITED STATES PATENT AND TRADEMARK OFFICE
CERTIFICATE OF CORRECTION

PATENT NO. : 6,657,934 B2
DATED : December 2, 2003
INVENTOR(S) : Katsumura

Page 1 of 1

It is certified that error appears in the above-identified patent and that said Letters Patent is hereby corrected as shown below:

<u>Title page,</u>
Item [30], Foreign Application Priority Data,
"Feb. 22, 2002 (JP) ..................2000-044754", should read
-- Feb. 22, 2000 (JP) ................2000-044754 --

Signed and Sealed this

Thirteenth Day of April, 2004

JON W. DUDAS
*Acting Director of the United States Patent and Trademark Office*